Dec. 16, 1958 F. MARTI 2,864,127
MULTILAYER PRESS
Filed March 29, 1956 2 Sheets-Sheet 1

INVENTOR
Fritz Marti
BY Michael S. Striker
ATTORNEY

Dec. 16, 1958 F. MARTI 2,864,127
MULTILAYER PRESS
Filed March 29, 1956 2 Sheets-Sheet 2

INVENTOR
Felix Marti
BY Michael S. Striker
ATTORNEY

United States Patent Office 2,864,127
Patented Dec. 16, 1958

2,864,127

MULTILAYER PRESS

Fritz Marti, Basel, Switzerland, assignor to Lonza Electric and Chemical Works Ltd., Gampel, Switzerland Application March 29, 1956, Serial No. 574,661

Claims priority, application Switzerland April 4, 1955

9 Claims. (Cl. 18—16)

The present invention relates to presses.

More particularly, the present invention relates to presses of the type which are used to apply pressure and heat to plastic work pieces so as to reduce the thickness of the plastic work pieces and increase the area thereof.

In multilayer presses of the above type there are a plurality of platens between which the work pieces are located, and these platens are guided by guide posts which extend with a relatively large clearance through openings of the platens so that the platens may expand and contract during heating thereof without binding on the guide posts, so that in this way the platens are free to move along the guide posts as well as to expand and contract. However, because of the great clearance between the platens and the guide posts there is a tendency of the platens to tilt and to produce a binding with the guide posts even though a relatively large clearance is provided.

One of the objects of the present invention is to provide a multilayer press of the above type with a means which will automatically prevent the platens from tilting undesirably with respect to each other.

Another object of the present invention is to provide a multilayer press with a means which is fully automatic as well as relatively simple for maintaining the platens parallel at all times to each other and for counteracting any tilting of the platens with respect to each other.

An additional object of the present invention is to provide a multilayer press with a means for counteracting tilting of the platens of the multilayer press in a manner which takes such a small amount of time that any slight tendency of the platens to tilt is immediately counteracted and thus binding of the platens on the guide posts is prevented and maintenance of the parallel relationship between the platens is obtained at all times.

A further object of the present invention is to provide a multilayer press with a means which automatically maintains the platens of the press parallel to each other and which at the same time eliminates the necessity of a safety device for preventing overloading of the press.

Also, it is an object of the present invention to provide the multilayer press with a means which limits the extent of operation of parts of the control apparatus so that these parts cannot become damaged.

With the above objects in view the present invention mainly consists of a multilayer press which includes a base and a plurality of guide posts connected to and extending upwardly from the base. A plurality of platens are respectively formed with openings through which the guide posts extend with clearance, and these platens are located one above the other and are spaced from and substantially parallel to each other. A plurality of pneumatic means are respectively located between and operatively connected to each pair of successive platens for yieldably resisting the movement of the platens toward each other, and an automatic control means is provided for maintaining in the plurality of pneumatic means pressures, respectively, which counteract any tilting of the platens with respect to each other and thus maintain the platens parallel to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
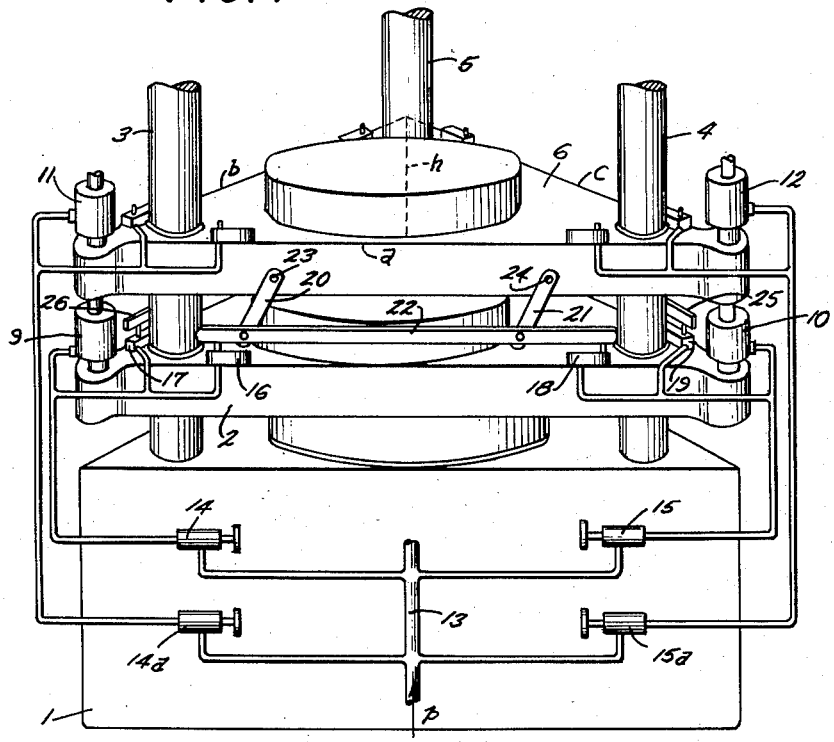
Fig. 1 is a schematic, fragmentary, front elevational, perspective view of one possible structure of a multilayer press according to the present invention.

Referring now to the drawings, and to Fig. 1 in particular, it will be seen that the multilayer press which is illustrated in Fig. 1 includes a base 1 which forms in part a cylinder in which slides a piston which engages and cooperates with the lowermost platen 2 for moving the latter up and down. The piston which slides into the cylinder of the base 1 is moved by a conventional hydraulic fluid under pressure, and the hydraulic means for raising and lowering the piston so as to raise and lower the lowermost platen 2 forms no part of the present invention and is not illustrated in the drawings. A plurality of guide posts 3, 4, and 5 which are substantially parallel to each other are spaced from each other and are connected to and extend upwardly from the base 1, in the manner shown in Fig. 1. These guide posts 3—5 are fixed at their upper end portions to a topmost stationary platen toward which all of the platens beneath the same are moved when the piston engaging the lowermost platen 2 is raised. A plurality of intermediate platens are located between the unillustrated uppermost stationary platen and the lowermost platen 2, and only one of these intermediate platens 6 is shown in Fig. 1. For example, four or five intermediate platens 6 may be located between the highest and lowest platens, and a work piece in the form of a block of plastic is located between each pair of successive platens. Thus the work piece 7 is shown between the platens 2 and 6, and the work piece 8 is shown in Fig. 1 on the top face of platen 6, this work piece 8 engaging the next highermost intermediate platen which is not illustrated in Fig. 1. These plastic work pieces are compressed between the platens when the latter are moved toward each other, and the platens are heated in a manner well known in the art and not forming part of the present invention and not being illustrated in the drawings, so that in this way the thickness of the work pieces is reduced and their area is increased. Each of the platens except the uppermost platen is formed with a plurality of openings through which the posts 3—5 respectively extend with clearance. This clearance of the guide posts in each opening may be on the order of 5–10 mm.

In order to maintain the platens parallel to each other, these platens being of a substantially triangular configuration according to the embodiment of the invention shown in Fig. 1, there are located at the corners of the platens a plurality of pneumatic means, respectively, which are connected to the platens by strong ball and socket joints, for example. In the example shown in Fig. 1, the pneumatic means takes the form of cylinders and pistons respectively slidable therein. Thus, the pneumatic means 9 and 10 are shown connected to and extending between the platens 2 and 6, while a third pneumatic means located at the rear corners of the platens 2 and 6, as viewed in Fig. 1, is obstructed from view by the structure shown in Fig. 1. In the same way three pneumatic means engage and are located between the platen 6 and the next higher platen, and only two of these pneumatic means 11 and 12 are shown in Fig. 1, the third pneumatic means being hidden by the guide post 5. The cylinders of the pneumatic means may be fixed at an upper end wall thereof to the platen located above the same, while the pistons of the pneumatic means are connected to the platens located below the pneumatic means. Of course, this arrangement may be reversed with the pistons of each pneumatic means being connected to the platen above the pneumatic means and the cylinders thereof connected to the platen below the pneumatic means. A fluid such as compressed air is located in each of the pneumatic means. The series of three pneumatic means located between and operatively connected by ball and socket joints or the like to each pair of successive platens is identical between each pair of platens. A supply conduit 13 which communicates with any suitable source of compressed air communicates with the several cylinders of the plurality of pneumatic means in the manner shown diagrammatically in Fig. 1, and a means for retarding the flow of the compressed air to these several pneumatic means cooperates with the supply means 13. This flow retarding means takes the form of needle valves, and needle valves 14 and 15 are diagrammatically shown in Fig. 1 for restricting the flow of fluid under pressure to the pneumatic means 9 and 10, respectively, while the needle valves 14a and 15a are shown in Fig. 1 regulating the flow of fluid under pressure to the pair of pneumatic means 11 and 12.

The pressure of the fluid in each pneumatic means is controlled by a pair of fluid pressure release valves which are connected in parallel with each other and associated with each pneumatic means. Each of these release valves include a valve member which is urged by a spring of the valve toward its open position and which is maintained closed or almost closed by a parallelogram linkage means which automatically controls the release valve so as to regulate the pressure in the pneumatic means. As may be seen from Fig. 1, the release valves 16 and 17 communicate with the pneumatic means 9 for controlling the release of air under pressure therefrom, and the release valves 18 and 19 cooperate in the same way with the pneumatic means 10. In the same way a pair of release valves are associated with each of the pneumatic means. It will be noted that each pneumatic means is located at a corner of each platen and that the pair of release valves associated with each pneumatic means are arranged at an angle to each other along the two sides of the platen which form the corner of the platen at which the particular pneumatic means is located. The parallelogram linkage means which controls the release valves in a fully automatic manner takes the form of a pair of links 20 and 21 pivotally carried by pivot pins 23 and 24 affixed to each side of the platen 6, and the links 20 and 21 are connected pivotally to an elongated rigid bar 22, which, because of the equal lengths of the links 20 and 21, is maintained at all times parallel to the platen 6 irrespective of the distance between the bar 22 and the platen 6. This bar 22 engages the valves 16 and 18 for controlling the latter. Parallelogram linkages of this type are connected to the sides of each platen, respectively, except the lowermost platen 2, and it will be noted that the parallelogram linkages carried by one platen control the valve means associated with the pneumatic means located between this one platen and the next lower platen. Thus, as is evident from Fig. 1, the parallelogram linkage means carried by the platen 6 controls the valves 16 and 18 associated with the pneumatic means 9 and 10 extending between the platen 6 and the next lower platen 2. Only the horizontally extending bars 26 and 25 of the other two parallelogram linkages carried by the triangular platen 6 are visible in Fig. 1, and it will be seen that the bar 26 controls the valve 17 as well as another valve at the rear of the platen 2, while the bar 25 controls the valve 19 as well as another valve at the rear of the platen 2. Thus, the three sides a, b, and c of the platen 6 respectively carry parallelogram linkage means which automatically control a valve means for controlling the pressure of the fluid in the pneumatic means, as will be apparent from the description below.

The above described structure operates as follows:

Considering the parallelogram linkage 20—22 and the valves 16 and 18 shown in Fig. 1, during movement of the platens toward each other to apply heat and pressure to the work pieces, the bar 22 of the parallelogram linkage will engage the valves 16 and 18 with a uniform relatively small pressure which is sufficient to hold these valves closed or almost closed against the pressure of the springs of these valves which resiliently urge the valves to their open position. If the valves 16 and 18 are designed so as to be maintained closed by engagement of the bar 22 of the parallelogram linkage, then the pressure in the pneumatic means 9 and 10 simply increases during operation of the press up to the limit of the pressure which is maintained in the supply conduit 13. On the other hand, if the arrangement is so designed that the bar 22 engages the valves 16 and 18 in a manner which holds these valves slightly open so that air under pressure is continually escaping from the pneumatic means 9 and 10, then the pressure of the fluid in the latter will have a value determined by the relationship of the valves 14 and 15 which supply air to the pneumatic means 9 and 10 and the valves 16 and 18. In other words with this arrangement a certain amount of air under pressure will be supplied to the pneumatic means and will be continually escaping therefrom and therefore a differential pressure will be maintained in the pneumatic means 9 and 10.

If the work piece 7 which is being compressed by the heated platens 6 and 2 were of absolutely uniform thickness and of absolutely uniform properties throughout its entire cross section, then it is possible that there would never be any tendency of the platens 2 and 6 to tilt with respect to each other. However, such uniformity of the work pieces is seldom present, and this is particularly true when working with thermoplastics. Therefore, it frequently happens that during operation a certain portion of the work piece will be compressed and will flow more easily than other portions thereof, and this will give rise to tilting of the platens which is very undesirable for the reasons mentioned above. If it is assumed that the right portion of the work piece 7, as viewed in Fig. 1, yields more readily to the heat and pressure than the left portion thereof, then the right corner of the platen 6, as viewed in Fig. 1, will tend to tilt downwardly during operation of the press. Because of the parallelogram linkage arrangement, the bar 22 will remain at all times parallel to the platen 6, and therefore when the right corner of the latter turns downwardly, the right end of the bar 22 will also tilt downwardly to maintain the valve 18 closed, and at the same time the left end of the bar 22 will move upwardly to permit the valve 16 to become fully opened so that fluid under pressure escapes freely from the pneumatic means 9 while fluid under pressure is retained in the pneumatic means 10. As a result the pneumatic means 10 automatically resists movement of the right corners of the platens 2 and 6 toward each other while the left corners of these platens can move more readily toward each other due to the lesser pressure in the pneumatic means 9, and as a result the platen 6 is immediately returned to its parallel relationship with the platen 2, and binding with the guide posts cannot occur. Thus, with the arrangement of the invention any tendency of the platens to tilt with respect to each other is immediately counteracted and the parallel relationship between the platens is guaranteed.

At the same time that the above described operations take place automatically to maintain the platen 6 parallel to the platen 2, the pneumatic means 11 and 12 which cooperate with the platen above the platen 6 also contribute to maintaining the platen 6 parallel to the platen 2 as well as the platen above the platen 6. As was pointed out above, all of the platens except the platen 2 carry parallelogram linkage means of the type described above at all of their sides. Thus, the platen above the platen 6 is provided with a parallelogram linkage means which controls the release valves operatively connected to the pneumatic means 11 and 12. Therefore, when the right corner of the platen 6 tilts downwardly to the slightest extent, in addition to the above described operations, the valve on platen 6 which corresponds to valve 18 moves away from the rod 22 of the parallelogram linkage connected to the platen above platen 6 and thus the pressure of the pneumatic means 12 is diminished since the fluid therein can readily escape. At the same time the parallelogram linkage maintains the release valves cooperating with the pneumatic means 11 closed. Therefore, the pneumatic means 10 has a higher pressure than the pneumatic means 12 and can immediately move the platen 6 back to its parallel position with respect to its neighboring platen, and at the same time the higher pressure that the pneumatic means 11 has with respect to the pneumatic means 9 also contributes to the immediate return of the platen 6 to its desired position.

The above described operation has been made with reference to the platen 6 about the axis $h$, indicated in Fig. 1. Because of the arrangement of parallelogram linkages at all sides of the platen and because of the distribution of the pneumatic means and the release valve at the corners of the platens, the same operation takes place irrespective of the particular axis about which the platen tilts. Furthermore, since all of the platens are provided with the automatic control means described above, the entire press will operate in a manner which automatically maintains the platens parallel to each other.

Although it is possible to use hydraulic rather than pneumatic means, pneumatic means are preferred for several reasons. Thus, with the disclosed arrangement the operation of the structure to counteract tilting of the platens operate so quickly that only a very slight tilting of the platens can occur before the tilting is immediately counteracted and the platens maintained parallel. Furthermore, because of the great yieldability and resiliency of the pneumatic means, it is possible to eliminate with the structure of the invention any safety devices for preventing overloading of the press. With the pneumatic means disclosed, the yieldability of the pneumatic means which resist the movement of the platens toward each other is so great that any overloading will be transferred to the work material itself, and thus a safety device to prevent overloading is completely unnecessary with the structure of the invention.

Figure 2:
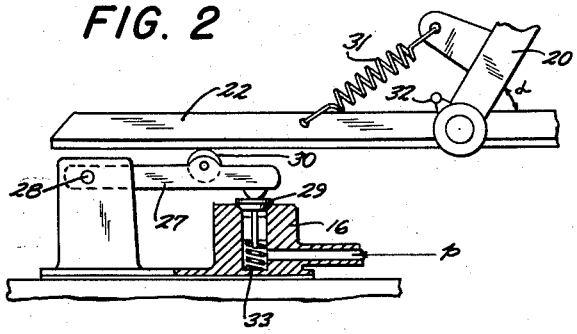
Fig. 2 shows partly in section and on an enlarged scale the cooperation between a valve and a control means thereof according to the present invention.

The structure of the invention is illustrated diagrammatically in Fig. 1 in order to give as clear as possible a picture of the overall arrangement of the invention. Fig. 2 illustrates one possible actual construction of the release valve and the manner in which the parallelogram linkage means controls the same. Thus, as may be seen from Fig. 2, a lever 27 is pivoted at 28 to a support lug which is fixed to a platen, and this lever 27 turnably supports a roller 30. The right end portion of the lever 27, as viewed in Fig. 2, is provided with a projection which engages the top face of the valve member 29 of the valve 16, the other release valve being constructed in the same way. The stem of the valve 29 has fixed thereto a plurality of radially extending fins which slidably engage the surface at the interior of the valve 16 so as to guide the valve member 29 for up and down movement. A spring 33 within the valve 16 engages the bottom ends of the fins for urging the valve 29 upwardly to its open position, and the engagement of bar 22 with the roller 30 maintains the valve 29 closed against the force of the spring 33. As is evident from Fig. 2, the bar 22 carries a pivot pin which is pivotally connected to the link 20, and in the same way the link 21 is connected to the bar 22. A spring 31 is connected at one end to a lug affixed to and extending from the link 20 and at its opposite end to the bar 22, and this spring 31 urges the parallelogram linkage to a position where the angle $\alpha$ is a right angle. Thus, the spring 31 urges the bar 22 downwardly when the parallelogram linkage has the position shown in Figs. 1 and 2 since the spring 31 is at all times urging the parallelogram linkage to a position where the links 20 and 21 extend normally with respect to the bar 22. In this way the pressure which is applied to the roller 30 simply by the weight of the parallelogram linkage is augmented by the force of the spring 31, and it is thus possible by proper choosing of the springs 33 and 31 to design the parts so that the parallelogram linkages will maintain the release valves fully closed or partly closed, as desired. If it were possible for the spring 31 to place the parallelogram linkage in a position where the links 20 and 21 were normal to the bar 22, then the operation of the parallelogram linkage might be blocked because vertically upward forces simply would not be able to turn the links 20 and 21. For this reason the link 20 is provided with a stop member 32 which extends over the bar 22 and engages the latter when the angle $\alpha$ has the value of 80–85°, for example, so that in this way the parallelogram linkage is prevented from assuming a position where the links 20 and 21 are perpendicular to the bar 22, and thus proper operation of the structure is assured. In the arrangement shown in Fig. 2 the weight of the parallelogram linkage plus the force of the spring 31 counteract the pressure $p$ of the air and the force of the spring 33, and the valve member 29 is shown as being maintained closed. However the parts can be so designed that the valve 29 will remain open slightly during normal operation. It is evident from Fig. 2 that the slightest tilting of the bar 22 together with the platen to which it is connected will result in turning of the lever 27 to control the valve in the manner described above.

A disadvantage of the arrangement shown in Fig. 1 is that with triangular platens it is for all practical purposes possible to work only with circular work pieces, and furthermore when the work pieces are placed between the platens the parallelogram linkages are in the way and must be manually moved in order to give access to the space between the platens. It is therefore far more desirable to operate with a press which has rectangular platens, and in principle such platens require only a pair of parallelogram linkages along sides of the platen which intersect each other so that the remaining sides of the platens can be fully opened to give free access to the space between the platens. In practice only one side of the platens need be open in order to move work pieces into and out of the space between the platens, and therefore the parallelogram linkages are arranged on the other three sides of such rectangular platens.

The ball joint connections of the cylinder and piston type of pneumatic means to the platens, described above in connection with Fig. 1, is not always desirable, particularly in large presses. It is preferable to use pneumatic means composed of yieldable chambers which have closed ends and which are provided with a means for limiting the extent to which the chambers may contract and expand so that undesired stress on the wall of the yieldable chamber is avoided. Such yieldable chambers are preferably connected to elongated bars which extend along and beyond the platens.

Figure 3:
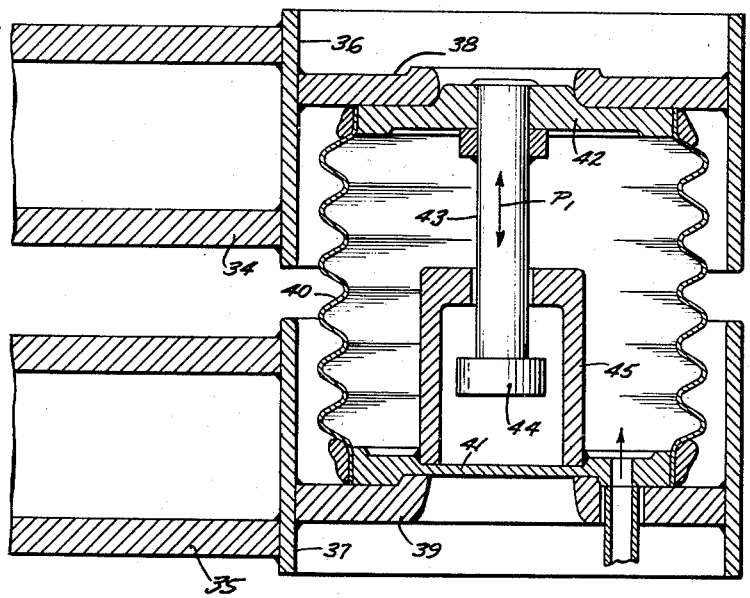
Fig. 3 shows in a sectional elevational view and also on an enlarged scale the construction of a pneumatic means according to the present invention.

A pneumatic means of this type is illustrated in detail in Fig. 3. Thus, referring to Fig. 3 it will be seen that an I-beam 34 is connected to a platen such as the platen 6, for example, and an I-beam 35 is connected to the next lower platen such as the platen 2, for example. These I-beams 34 and 35 are fixed at their web portions by bolts or the like to the outer side faces of the platens and the free end portions of the I-beams 34 and 35 extend beyond the platens. An annular ring 36 of cylindrical configuration is fixed to the free end of the I-beam 34 as by being welded thereto, and a similar ring 37 is fixed to the free end of the I-beam 35 as by being welded thereto. A wall 38 formed with a central opening is welded at its periphery to the inner surface of the ring 36, in the manner shown in Fig. 3, while a bottom wall 39 similar to the wall 38 is welded at its periphery to the inner face of the ring 37. The yieldable chamber is formed by an elongated tubular bellows 40 which may be made of a suitable metal or plastic capable of contracting and expanding in response to changes in the pressure of the fluid within the bellows 40. The top end of the bellows 40 is connected in a fluid-tight manner to the top wall 42 of the chamber, while the bottom end of the bellows 40 is connected in a fluid-tight manner to the bottom wall 41 of the expandable and compressible pneumatic chamber. It will be noted that this bottom wall 41 is provided with a bore which communicates in a fluid-tight manner with a conduit leading from the source of air under pressure, so that in this way the interior of the pneumatic chamber is supplied with air or the like under pressure. It is pointed out that all of the conduits described above for leading pneumatic fluid to and from the pneumatic means and valves as well as those described below are made of flexible materials which does not in any way interfere with the movement of the platens toward and away from each other.

In order to limit the extent to which the pneumatic chamber shown in Fig. 3 may be compressed and expanded, so as to prevent damage to the chamber, a bar 43 is fixed, as by welding, to the top wall 42 of the pneumatic chamber and extends downwardly therefrom through an opening in a top wall of a cylinder 45 which is fixed at its bottom end, as by welding, to the bottom wall 41 of the chamber. The bar 43 passes with considerable clearance through the top wall of the cylinder 45 and is provided within the cylinder 45 with an enlarged end 44 which cannot pass through the top wall of the cylinder 45, so that when the chamber is expanded to cause the bar 43 to move upwardly with respect to the cylinder 45 in the direction of the arrow $P_1$, the expansion of the chamber will be limited by engagement of the enlarged end 44 of the bar 43 with the top wall of the cylinder 45. When the chamber is contracting, the extent to which the pneumatic chamber can be compressed will be limited by engagement of the end 44 of bar 43 with the bottom wall 41 of the chamber, so that in this way excessive contraction and expansion of the chamber which might be likely to injure the same cannot occur.

Figure 4:
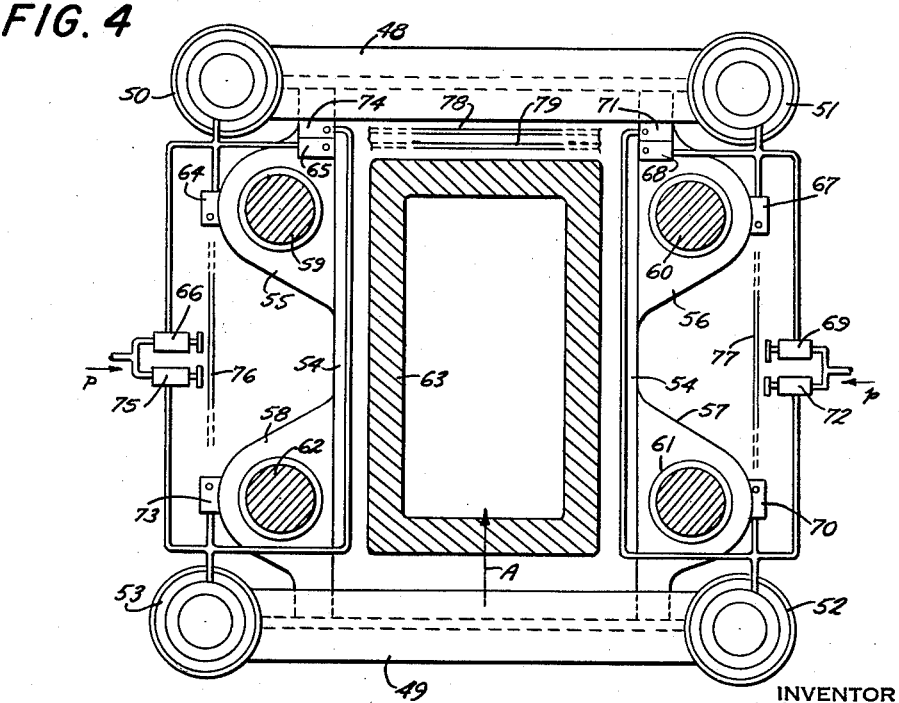
Fig. 4 is a sectional plan view showing the lowermost platen of another embodiment of a press according to the present invention with the structure associated therewith, part of this structure being shown diagrammatically.

Fig. 4 shows in a partly sectional top plan view the lowermost platen of a press which has rectangular platens of the type described above. The platen 54 is provided at its corners with eyes 55, 56, 57, and 58, respectively, and these eyes embrace the guide posts 59, 60, 61, and 62 with considerable clearance, as is evident from Fig. 4, these guide posts being connected to and extending upwardly from the unillustrated base of the press of Fig. 4 and a suitable hydraulic means such as a piston sliding in a cylinder of the base being connected to the bottom side of the lowermost platen 54 shown in Fig. 4 for moving this platen up and down. A pair of I-beams 48 and 49, identical with the I-beams 34 and 35 of Fig. 3, are fixed respectively to the rear and front edges of the platen 54. The top and bottom flanges of these I-beams overlap the platen and the webs of the I-beams are bolted, for example, to the side faces of the platen, so that in this way the I-beams are permanently fixed to the platen for movement therewith. As is evident from Fig. 4, the I-beams 48 and 49 have free end portions which extend beyond the platen, and the pneumatic means 50, 51, 52, and 53 are respectively fixed to the free ends of the I-beams 48 and 49, as shown in Fig. 4. These pneumatic means 50—53 each have the construction of the pneumatic means shown in detail in Fig. 3.

As is shown diagrammatically in Fig. 4, a pair of pressure release valves 64 and 65 having the construction of the valves shown in Fig. 2 communicate with the pneumatic means 50 and are carried by the platen 54 at the eye 55 thereof adjacent to the guide post 59. A needle valve 66 is located in the conduit which supplies the pneumatic means 50 with air under pressure so as to retard the flow of air under pressure to the pneumatic means 50. In the same way a pair of release valves 67 and 68 cooperate with the pneumatic means 51, and a needle valve 69 is located in the conduit which supplies air under pressure to the pneumatic means 51. A pair of pressure release valves 70 and 71 cooperate with the pneumatic means 52 for releasing air under pressure therefrom, and a needle valve 72 is located in the conduit which supplies this air under pressure to the pneumatic means 52, while a pair of pressure release valves 73 and 74 cooperate with the pneumatic means 53 and a needle valve 75 controls the flow of air under pressure to the pneumatic means 53. The platen which is just above the platen 54 shown in Fig. 4 carries a parallelogram linkage provided with a lower horizontal bar 76 which cooperates with the valves 64 and 73 in the same way that the bar 22 cooperates with the valves 16 and 18 described above. Also this next higher platen carries at its right side a parallelogram linkage provided with a lower horizontal bar 77 which cooperates with the valves 67 and 70. The rear side of the next higher platen which is not shown in Fig. 4 carries a parallelogram linkage provided with a lower bar 79 which cooperates with the valves 65 and 68 in the manner described above. The pivot pins at the rear side of the next higher platen which is not illustrated in Fig. 4 which support the parallelogram linkage which includes the lower bar 79 are longer than the other pivot pins carrying the other linkages and extend rearwardly beyond the parallelogram linkage which includes the bar 79 to support another parallelogram linkage which includes the lower horizontal bar 78 which cooperates with the valves 71 and 74 which respectively communicate with the pneumatic means 52 and 53. If desired, instead of two separate parallelogram linkages located at the rear side of the platens of the press of Fig. 4, a single parallelogram linkage having a lower bar wide enough to engage valves 74 and 65 at one end and valves 71 and 68 at the opposite end may be provided. Thus, with the arrangement of Fig. 4 there are no parallelogram linkages at the front side of the press, and thus work material may be placed into and removed from the space between the platens in the direction of arrow A of Fig. 4 without any problem raised because of the presence of parallelogram linkages at the front side of the press. Fig. 4 shows a mold 63 carried by the lower platen 54 of the press and in which the work piece is located so that when the work piece flows its outer configuration will be controlled by the shape of the mold 63 which is simply in the form of a rectangular member having a hollow interior and having an open top and bottom. The platens of the press of Fig. 4 are heated in a known way not forming part of the present invention and not shown in the drawings. It is evident that the arrangement of Fig. 4 will operate to prevent tilting of the platens in the same way as the embodiment of Fig. 1, and because of the rectangular shape of the platens the fact that there are no parallelogram linkages at the front side of the platen will not prevent the automatic tilting preventing means from operating properly.

If desired, the I-beams 34, 35, 48, and 49 may be welded instead of bolted to the platens.

It will be understood that each of the elements described above, or two or more together, may also find a useful application in other types of presses differing from the types described above.

While the invention has been illustrated and described as embodied in multilayer presses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a multilayer press, in combination, a base; a plurality of mutually spaced guide posts connected to and extending upwardly from said base; a plurality of platens located one above the other and each formed with a plurality of openings through which said guide posts respectively extend with clearance; a plurality of pneumatic means operatively connected to each pair of successive platens for yieldably resisting the movement of said platens toward each other; a plurality of valve means respectively cooperating with said plurality of pneumatic means for controlling the pressure of a fluid therein; and a pair of parallelogram linkage means respectively located in planes substantially parallel to said guide posts and making an angle with each other and respectively carried by each platen and engaging the valve means controlling the pneumatic means between each platen and the next lower platen for automatically operating said valve means to maintain in said plurality of pneumatic means pressures which counteract tilting of said platens with respect to each other and which automatically maintain said platens parallel to each other during operation of the press.

2. In a multilayer press, in combination, a base; a plurality of mutually spaced guide posts connected to and extending upwardly from said base; a plurality of platens located one above the other and each formed with a plurality of openings through which said guide posts respectively extend with clearance, said platens being spaced from and substantially parallel to each other; a plurality of pneumatic means extending between and operatively connected to each pair of successive platens for yieldably resisting the movement of said platens toward each other; supply means communicating with said plurality of pneumatic means for supplying the latter with fluid under pressure; a pair of valves communicating with pneumatic means for controlling the release of fluid under pressure therefrom; and parallelogram linkage means carried by each platen and automatically controlling the pairs of valves of the next lower platen for automatically maintaining in said plurality of pneumatic means pressures, respectively, which maintain said platens parallel to each other.

3. In a multilayer press, in combination, a base; a plurality of mutually spaced guide posts connected to and extending upwardly from said base; a plurality of platens located one above the other and each formed with a plurality of openings through which said guide posts respectively extend with clearance, said platens being spaced from and substantially parallel to each other; a plurality of pneumatic means extending between and operatively connected to each pair of successive platens for yieldably resisting the movement of said platens toward each other; supply means communicating with said plurality of pneumatic means for supplying the latter with fluid under pressure; a pair of valves communicating with pneumatic means for controlling the release of fluid under pressure therefrom; parallelogram linkage means carried by each platen and automatically controlling the pairs of valves of the next lower platen for automatically maintaining in said plurality of pneumatic means pressures, respectively, which maintain said platens parallel to each other; and means cooperating with said supply means for retarding the flow of fluid under pressure to said plurality of pneumatic means.

4. In a multilayer press, in combination, a base; a plurality of mutually spaced guide posts connected to and extending upwardly from said base; a plurality of platens located one above the other and each formed with a plurality of openings through which said guide posts respectively extend with clearance; a plurality of pneumatic means operatively connected to and distributed about each pair of successive platens for yieldably resisting the movement of said platens toward each other, each of said pneumatic means comprising a hollow compressible and expandable chamber and means for limiting the extent to which said chamber is compressed and expanded; valve means cooperating with said plurality of pneumatic means for controlling the pressure of a fluid therein; and automatic control means cooperating with said valve means for automatically operating the latter to maintain in said plurality of pneumatic means pressures which automatically maintain said platens parallel to each other.

5. In a multilayer press, in combination, a base; a plurality of mutually spaced posts connected to and extending upwardly from said base; a plurality of platens located one above the other and each formed with a plurality of openings through which said guide posts respectively extend with clearance, said platens being spaced from and substantially parallel to each other and being of a substantially rectangular configuration; four pneumatic means respectively connected operatively to each pair of succeeding platens for yieldably resisting the movement thereof toward each other; a pair of valves communicating with each pneumatic means for controlling the release of fluid under pressure therefrom and being angularly positioned with respect to each other, at least one pair of valves cooperating with a pair of pneumatic means located at one side of each platen being located at the opposite side of each platen; and parallelogram linkage means carried by each platen and cooperating the valves of the next lower platen for controlling the pressure of fluid in said plurality of pneumatic means for maintaining the platens parallel to each other, the parallel linkage means cooperating with said pair of valves at said opposite side of each platen being located at said opposite side of each platen to leave said one side of each platen free for insertion of work material between said platens.

6. In a multilayer press, in combination, a base; a plurality of guide posts spaced from each other, connected to said base, and extending upwardly therefrom; a plurality of substantially parallel mutually spaced platens located one above the other and each formed with openings through which said plurality of guide posts respectively extend with clearance; a plurality of elongated rigid bars fixed to and extending respectively along a plurality of edges of each platen and extending beyond the same; a plurality of pneumatic means located beyond said platens, respectively carried the free ends of said bars, and extending between each pair of successive platens for yieldably resisting movement thereof toward each other; and automatic control means controlling said pneumatic means for maintaining said platens parallel to each other.

7. In a multilayer press, in combination, a base; a plurality of spaced guide posts respectively connected to and extending upwardly from said base; a plurality of platens located one above the other and each formed with a plurality of openings through which said guide posts respectively extend with clearance; a plurality of pneumatic means operatively connected to and extending between each pair of said platens for yieldably resisting the movement thereof toward each other; and automatic control means cooperating with said plurality of pneumatic means for maintaining in the latter a pressure which maintains said platens parallel to each other, said control means including a plurality of valves for releasing pressure from said pneumatic means, a lever engaging each of said valves, a roller turnably carried by said lever, and a parallelogram linkage having an elongated member engaging said roller and controlling the position of said lever to control the opening and closing of each valve.

8. In a multilayer press, in combination, a base; a plurality of guide posts connected to and extending upwardly from said base; a plurality of platens located one above the other and each formed with a plurality of openings through which said guide posts respectively extend with clearance; a plurality of pneumatic means located between and operatively connected to each pair of successive platens for yieldably resisting movement thereof toward each other; a plurality of valve means respectively cooperating with said plurality of pneumatic means for controlling the pressure of a fluid therein; and a plurality of parallelogram linkage means cooperating with said valve means for automatically controlling the same to maintain in said pneumatic means, respectively, pressures which maintain said platens parallel to each other, each of said parallelogram linkage means including a spring means operatively connected to portions of said parallelogram linkage means for urging said parallelogram linkage means toward a position where the elements of the parallelogram linkage means form a rectangle.

9. In a multilayer press, in combination, a base; a plurality of guide posts connected to and extending upwardly from said base; a plurality of platens located one above the other and each formed with a plurality of openings through which said guide posts respectively extend with clearance; a plurality of pneumatic means located between and operatively connected to each pair of successive platens for yieldably resisting movement thereof toward each other; a plurality of valve means respectively cooperating with said plurality of pneumatic means for controlling the pressure of a fluid therein; and a plurality of parallelogram linkage means cooperating with said valve means for automatically controlling the same to maintain in said pneumatic means, respectively, pressures which maintain said platens parallel to each other, each of said parallelogram linkage means including a spring means operatively connected to portions of said parallelogram linkage means for urging said parallelogram linkage means toward a position where the elements of the parallelogram linkage means form a rectangle, and stop means carried by said parallelogram linkage means and forming part of the same for preventing said parallelogram linkage from being moved by said spring means to a position where the elements of the parallelogram linkage means form a rectangle.

References Cited in the file of this patent

UNITED STATES PATENTS

| | | |
|---|---|---|
| 2,309,944 | Flowers | Feb. 2, 1943 |
| 2,500,791 | Baldwin | Mar. 14, 1950 |
| 2,681,703 | Croucher | June 22, 1954 |